United States Patent
Manroa et al.

(10) Patent No.: US 8,054,780 B1
(45) Date of Patent: Nov. 8, 2011

(54) TRANSPARENT APPLICATION DATA NOTIFICATION DURING IMS REGISTRATIONS

(75) Inventors: Arun Manroa, Herndon, VA (US); Trinh D. Vu, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 493 days.

(21) Appl. No.: 12/330,692

(22) Filed: Dec. 9, 2008

(51) Int. Cl.
*H04Q 7/00* (2006.01)
*H04Q 7/24* (2006.01)
*H04B 3/36* (2006.01)
*H04H 1/00* (2006.01)

(52) U.S. Cl. ........ 370/328; 370/338; 370/401; 370/410; 375/211; 455/3.01

(58) Field of Classification Search .................. 370/279, 370/328, 338, 397, 401, 409, 410, 3.01, 11.1, 370/293–296, 352–356; 455/3.01, 11.1, 455/412.1, 412.2, 518, 414.1, 519, 520; 379/202.01, 379/35, 210.01; 705/14.25, 59, 901–908; 375/211

See application file for complete search history.

(56) References Cited

U.S. PATENT DOCUMENTS

| | | | | |
|---|---|---|---|---|
| 5,590,126 A | * | 12/1996 | Mishra et al. | 370/329 |
| 6,085,238 A | * | 7/2000 | Yuasa et al. | 709/223 |
| 6,094,424 A | * | 7/2000 | Kalmanek et al. | 370/328 |
| 2004/0128345 A1 | * | 7/2004 | Robinson et al. | 709/203 |
| 2005/0114896 A1 | * | 5/2005 | Hug et al. | 725/88 |
| 2009/0080387 A1 | * | 3/2009 | Dell'Uomo et al. | 370/338 |
| 2011/0007691 A1 | * | 1/2011 | Awano | 370/328 |

* cited by examiner

*Primary Examiner* — Afsar M. Qureshi (57) ABSTRACT

A method and system for aggregate registration and transparent data notification to services during IMS registration. A network entity, such as Serving Call Session Control Function (S-CSCF) may receive an aggregate registration request that includes a plurality of service identifiers and associated service-specific data sets. The aggregate registration request is sent by a user agent or other similar program on behalf of a user. The network entity then sends a notification to each particular service of the plurality of services, including in each notification the service-specific data set for the particular service. The user may thus supply service-specific data to each service during IMS registration, obviating the need for the user to directly and separately contact each service for the purpose of supplying service-specific data.

25 Claims, 7 Drawing Sheets

FIG. 7 ical frame- 15 UA's registration requests may thus be channeled to the
TRANSPARENT APPLICATION DATA NOTIFICATION DURING IMS REGISTRATIONS

BACKGROUND

The advent and evolution in recent years of technologies and standards for high-rate transmission of packet data over cellular radio access networks has been part of a larger picture that includes advances in the development of packet transport networks and service networks for delivery of packet-data services, all collectively referred to as "third generation" (3G) networks. In the context of the larger picture, there have been industry-wide efforts to coordinate various elemental functions and subsystems within a common architectural framework and based upon common, standard interfaces and protocols for communication. Industry consortia including the $3^{rd}$ Generation Partnership Project (3GPP) and the 3GPP2, among others, have developed and published specifications relating to numerous aspects of 3G networks, from access devices, to access networks, to core transport networks, to service-delivery networks, as well as the communication methods that form the basis for network operation and services.

Packet-data transport and services in 3G networks are based in a large part on the "Internet Protocol" (IP) and the IP suite of protocol standards. As such, 3G networks themselves incorporate IP networks. In particular, IP-packet-based media services, such as "Voice over IP" (VoIP), video streaming, and packet-media broadcast collectively comprise an "IP Multimedia Subsystem" (IMS) network within a 3G system. Built upon standard signaling protocols, such as Session Initiation Protocol (SIP), standard media transport protocols, such as Real-time Transport Protocol (RTP), and standard policy management protocols such as Common Open Policy Service (COPS), among others, the IMS network provides an infrastructure for integrating new and emerging IP-based services for subscribers in 3G networks. In turn, owners and operators of 3G networks can generate revenue by charging subscribers for IMS-based services according to one or more fee structures, for example.

OVERVIEW

While standards generally provide important guidance to carriers and service providers as they implement and deploy 3G (and even later generation) networks, standards for some aspects of these communication systems are still not fully defined. In particular, a standard framework for the development of new services and for the integration of those services into the IMS network, remains incomplete, and in some respects even lacking. On one level, this reflects the importance, both in terms of business and technology, to carriers and service providers of developing and deploying new services without having to wait for the development and/or adoption of every possibly-relevant standard. On another level, a partial absence of standards can provide a freer, unfettered context for innovation and differentiation of new services. Moreover, new services can help drive and shape standards, as preferred modes of implementation and operation of those services are recognized through practice.

Within the IMS network, services and applications are usually implemented on one or more servers or application platforms. A subscriber (or user) in a service provider's network accesses communication services via an access terminal ("AT"), such as a cellular or wireless telephone, pager, or appropriately equipped wireless or wireline portable computer, for instance. A user will typically first register with one or more services or applications via the access terminal prior to using the services. More specifically, an AT will execute a software program referred to as a "user agent" (or "UA") that acts on behalf of the user of the AT in order to, among other functions, register with and invoke the one or more services. In order to simplify the registration process, as well as improve efficiency by reducing registration-related traffic, the IMS network includes a functional element that receives registration requests on a "front end" from users and routes those requests to the appropriate services on the "back end." In the IMS network, this functional element is called a "Call Session Control Function" ("CSCF"), or more precisely, a "Serving" CSCF (or "S-CSCF"), as described below. A given UA's registration requests may thus be channeled to the proper server or application platform via the S-CSCF, alleviating the need for the UA to directly and separately register with each service.

Service registration is one of the areas of IMS deployment for which standards are only partially defined. More particularly, while the role of the S-CSCF as a sort of service-registration intermediary has been defined according to various standards, many services expect or require application-specific data to be supplied as part of the registration process, or at least prior using the service. The IMS registration method provides no way to accomplish this other than direct and separate communication between the UA and each such service or application, yielding an approach that thus bypasses the S-CSCF. Consequently, much of the simplicity and efficiency introduced by the S-CSCF-based registration approach is lost when a user registers for a plurality of services, some or all of which require application-specific data.

Accordingly, embodiments of the present invention are directed to a method and system of registering for a plurality of applications or services, and for transparently passing application-specific data to each service or application of the plurality as part of a notification of the registration. More specifically, a user agent may construct an aggregate registration request for a plurality of services or applications that includes identifiers for each service or application, as well as application-specific data for each service or application. The request may be sent to an S-CSCF (or other appropriate network entity), which may in turn register the UA with each service or application, passing along the application-specific data in the process. Advantageously, the efficiency of a registration intermediary is retained, even for the case of registering for a plurality of services or applications that expect or require application-specific data at the time of registration.

Hence, in one respect, various embodiments of the present invention provide a method of registering for a plurality of services in a communication services network, the method comprising: at a network entity, receiving an aggregate registration request for the plurality of services, the aggregate registration request including for each particular service of the plurality a respective service identifier and a respective service-specific data set; and at the network entity, sending to each particular service of the plurality a respective notification indicating receipt by the network entity of the aggregate registration request and including the respective service-specific data set for the particular service.

In another respect, various embodiments of the present invention provide a method of registering for a plurality of services in a communication services network, the method comprising: at an access terminal, generating an aggregate registration request for the plurality of services, the aggregate registration request including for each particular service of the plurality a respective service identifier and a respective service-specific data set; and at the access terminal, sending the aggregate registration request to a network entity that responsively notifies each particular service of the plurality of the request and further provides each particular service with its service-specific data set.

In yet a further respect, various embodiments of the present invention provide, in a network entity operating in a communication services network, an improvement comprising: means for receiving from an access terminal an aggregate registration request for a plurality of services, wherein the aggregate registration request includes for each particular service of the plurality a respective service identifier and a respective service-specific data set; and means for sending to each particular service of the plurality a respective notification indicating receipt by the network entity of the aggregate registration request and including the respective service-specific data set for the particular service.

In still a further respect, various embodiments of the present invention provide, in an access terminal operating in a communication services network, an improvement comprising: means for generating an aggregate registration request for a plurality of services, the aggregate registration request including for each particular service of the plurality a respective service identifier and a respective service-specific data set; and means for sending the aggregate registration request to a network entity that responsively notifies each particular service of the plurality of the request and further provides each particular service with its service-specific data set.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Figure 1:
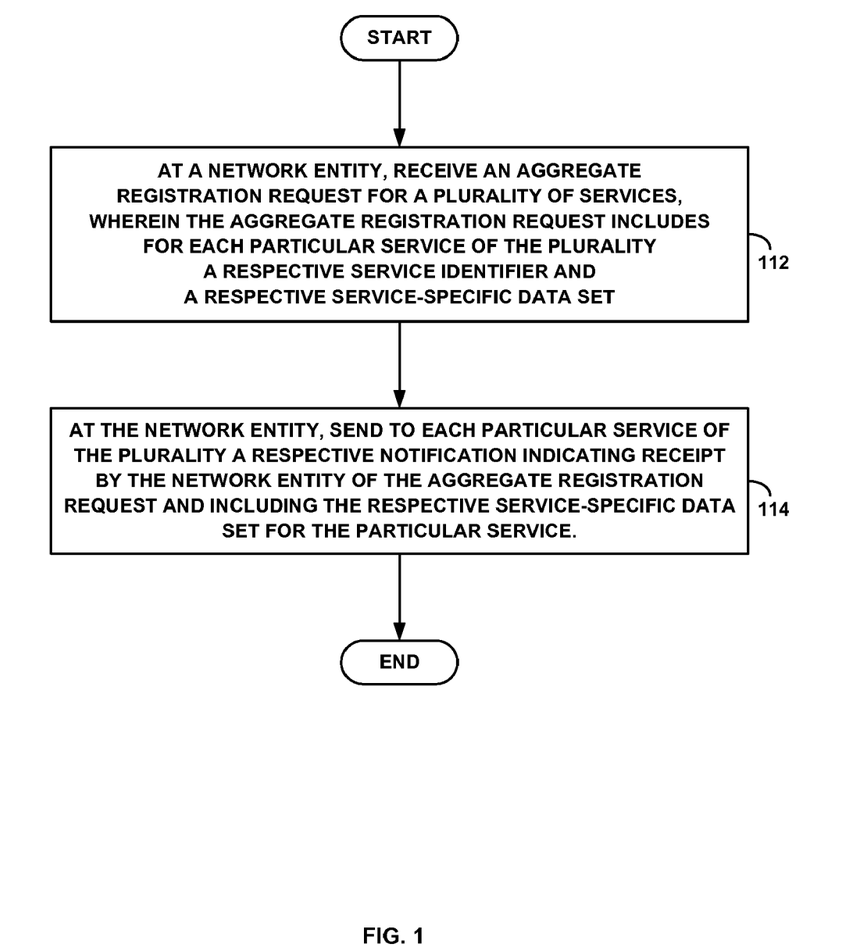
FIG. 1 is a flowchart illustrating an example the method of aggregate registration and transparent data notification.

An example embodiment of the present invention is illustrated in the form of a flowchart in FIG. 1. At step 112, a network entity in a communication services network receives an aggregate registration request for a plurality of services. The aggregate registration request includes for each particular service of the plurality a respective service identifier and a respective service-specific data set. For each particular service of the plurality, the service-specific data set comprises data that the particular service expects or requires for registration, or at least prior to use of the service. In accordance with the example embodiment, the aggregate registration request is sent on behalf of a user by a user agent or other similar program, executing on an access terminal operated by the user.

Examples of services (or applications) could include "Push-to-Talk" ("PTT"), presence, and media streaming broadcasts. Application-specific data sets could comprise user location, vocoders supported by a user's access terminal, device type, and communication ports, for instance. These example applications and the possible contents of their application-specific data sets should not be viewed as limiting with respect to the present invention.

At step 114, the network entity sends to each particular service of the plurality a respective notification indicating receipt by the network entity of the aggregate registration request. Each notification will include the respective service-specific data set for the particular service. In sending the service-specific data set to each particular service, the network entity does not need to know the contents of the data sets. Hence, the service-specific data are passed transparently by the entity to the services.

In further accordance with the example embodiment, each particular service will have previously subscribed to the network entity for registration events. In so doing, each service will have established a standing request to be alerted by the network entity whenever the network entity receives a registration request from a user agent (on behalf of a user). Advantageously, the network entity may filter notification messages according to whether or not an aggregate registration request identifies a particular service that has subscribed to registration events. Thus, even if a particular service subscribed to registration events at the network entity, the network entity could condition notification of a particular aggregate registration event on finding a service identifier for the particular service in the aggregate registration request. Aggregate registration requests could even include service identifiers with empty data sets for one or more particular services. Alternatively, the S-CSCF could notify each service that had subscribed to the S-CSCF, regardless of whether or not the service is identified in an aggregate registration request. However, only those services identified and having associated service-specific data sets in the aggregate registration request would receive their service-specific data sets in their notification.

In practice, the communication services network could be an IMS network, the network entity could be an S-CSCF, and the user agent could be a SIP user agent. In this case, the aggregate registration request could comprise a SIP REGISTER message, and the service identifiers and associated service-specific data sets could be organized according to XML format and be included in the message body. Further, each service could subscribe to the S-CSCF for registration events by sending a SIP NOTIFY message to the S-CSCF. Additionally, notification could be a SIP NOTIFY message that contains the respective service-specific data set in XML format.

It should be understood that the embodiment depicted in FIG. 1 is illustrative of the invention, and that other embodiments are possible as well.

1. NETWORK ARCHITECTURE AND CLIENT STATION ACCESS

Figure 2:
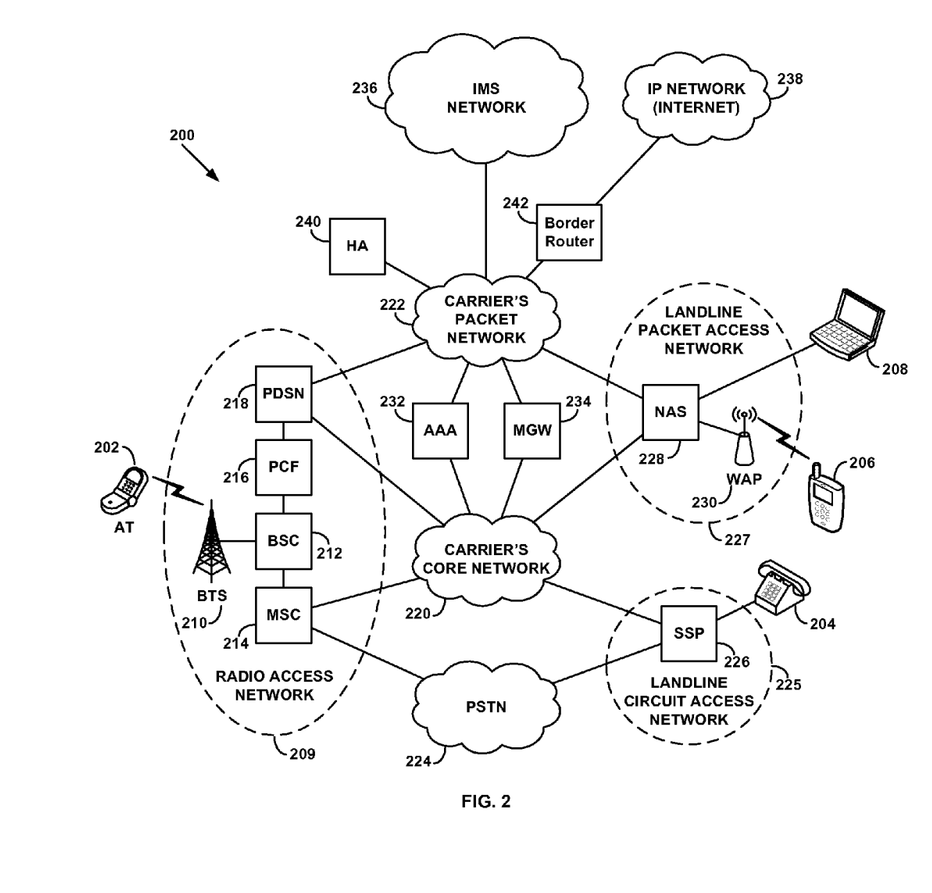
FIG. 2 is an example representation of a carrier network in which aggregate registration and transparent data notification can be carried out, wherein details of the IMS network are omitted from the example representation.

FIG. 2 illustrates an exemplary telecommunication network 200 in which aggregate service registration could be carried out. Telecommunication network 200 may be taken as representing a 3G network and includes, by way of example, network elements and components suitable for supporting both circuit-based telecommunication services, such cellular and landline voice calls, and IMS-based packet-based data communication services, such as web browsing, VoIP, voice-mail, and e-mail communication.

Example network 200 includes a carrier's core network 220, which is then connected to one or more access networks/systems, such as a radio access network (RAN) 209, landline circuit access network 225, and landline packet access network 227, each of which may allow subscribers to engage in telecommunication services such as voice telephony, and/or in data communications. Each of the access networks is coupled, in turn, with one or more transport networks, such as the public switched telephone network (PSTN) 224 and (either directly or through core network 220, via media gateway (MGW) 234) a packet network 222.

Packet network 222 is connected to the carrier's IMS network 236, and also to external IP network 238 (e.g., the public Internet) by way of border router 242. In turn, border router 242 functions in part to enforce traffic policy at the boundaries between the networks that it connects. Related actions of the border router may include monitoring and controlling traffic flow in order to comply with service level agreements (e.g., bandwidth limits) between the connected networks, carrying out security-related procedures, and performing any necessary protocol or address translations, for example.

Core network 220 provides connectivity to various elements, components and entities of network 200, and serves as a transport network for communications among them. Operationally, core network 220 also supports delivery of circuit-based user services and features via signaling and bearer channels, for example, carried over inter-switch digital trunks for regional and long-distance calls. As such, core network 220 may also comprise what is commonly referred to as a backbone network. Core network 220 could be an ATM and/or IP-based network, for example, and could comprise more than one physical and/or logical network and/or sub-network, as well as interconnecting routers and switches. Other transport technologies are possible as well, as are a variety of network topologies and routing/switching protocols and platforms.

In the context of FIG. 2, core network 220 represents at least the communicative coupling of the attached elements shown, as well as other possible entities that are not shown. Note, however, that the exemplary connectivity between network entities provided via core network 220 is not intended to be limiting with respect to other methods or means of communication between any two or more network entities, elements or components. For example, a group of servers and databases (not shown) that supports a coordinated set of functions, such as billing or user account services, could communicate within an IP sub-network or LAN that is itself connected to core network via a router, or the like. Other arrangements are possible as well.

As noted above, exemplary network 200 also includes packet network 222, which may be a different physical network from core network 220, a separate virtual network overlaid on core network 220, or some combination of both. Other arrangements are possible as well. Packet network 222 provides packet-data transport and services to users and to network servers and other network entities that require packet-data communications. In a preferred embodiment, packet network 222 is an IP network, capable of transporting IP-based service, such as web browsing, VoIP, and the like. The services themselves are based in and delivered from the IMS network 236, which is described below in connection with FIG. 3.

Users may access features and services of network 200 via one or more ATs or client stations, exemplified in FIG. 2 by client access devices 202, 204, 206, and 208. Each illustrates by way of example a different mode and technology of network access, as well as a different form of client station. For example, access terminal 202 represents a 3G cellular phone, or wireless communication device, that may support both circuit-cellular and packet-data communications using CDMA and/or GPRS/GSM cellular radio access technologies, for instance. Telephone 204 represents a landline telephone, such as one used for circuit-based residential service with a local exchange carrier (LEC). Alternatively, telephone 204 could be a digital PBX phone that accesses the LEC via a PBX switch (not shown), for example. Client station 206 represents a wireless intelligent device, such as a packet-telephony (e.g., VoIP) phone, or the like, with wireless local area network (WLAN) access, such as IEEE 802.11 (also referred to as "wireless Ethernet"), to a packet network. Likewise, client station 208 could be a similar type of intelligent device, but with wired LAN access, such as Ethernet, to a packet network. These example client stations are not meant to be limiting, and other types and/or combinations of devices are possible. For instance, client station 206 could be a personal computer (PC) or workstation having a WLAN interface, and client station 208 could be a wired VoIP phone. Further, AT 202 could incorporate technology for WLAN access as well as cellular radio access to a packet-data network, thus supporting so-called dual-mode capability.

It should be noted that while the term "access terminal" customarily refers to a wireless communication device operating in a wireless communication system, in the context of IMS services and the like that are available in a 3G (or later generation) network, an access terminal is not necessarily limited to being a wireless communication device. As described below, client stations may use wireless or wireline technologies to connect to and access network transport and services. Thus, although wireless access technologies have been important drivers in the development of IMS services, and ATs are generally considered as being client devices in wireless networks, the term "access terminal" or "AT" used here does not exclude wireline client devices, except to the extent that a particular function or service would only apply to or make sense for wireless access.

Client stations preferably access network 200 via one or more of the connected access networks, each of which comprises at least one switch, router, or similar entity that includes one or more interfaces to network 200. For example, cellular radio access to network 200 by wireless devices, such as exemplary AT 202, is provided by RAN 209. As illustrated in FIG. 2, RAN 209 comprises base transceiver station (BTS) 210 connected to the network via base station controller (BSC) 212, which in turn is connected both to the circuit-cellular network via MSC 214, and to the packet-data network via PDSN 218, by way of packet control function (PCF) 216. PDSN 218 also includes a connection to core network 220.

In typical operation of RAN 209, BTS 210 provides an air interface link to AT 202 (or similar device), while BSC 212 controls BTS 210, for example assigning specific air interface channels and managing mobility of AT 202 across possibly multiple BTSs under its control. Both circuit-cellular and packet data services may be supported according to well-known standards, including IS-2000 and IS-856, for example, both of which may be considered as part of a CDMA family of protocols. For circuit-cellular services, such as circuit-based telephony, communications are then routed between BSC 212 and MSC 214, which in turn provides connectivity to core network 220, to one or more other MSCs or circuit telephony switches (either directly or via core network 220), or to PSTN 224 via digital trunks or similar links to a switch or switches in the PSTN. For packet-data services, such as web browsing and IP multi-media services, communications are instead routed between BSC 212 and IMS network 236 via packet network 222, by way of PCF 216 and PDSN 218.

More specifically, for data services, AT 202 (or similar cellular wireless device) will first establish a packet-data session in packet network 222 via PCF 216 and PDSN 218. The packet-data session provides the access terminal an IP address and establishes a point of contact for IP communications with it. In exemplary operation, PDSN 218 in RAN 209 may receive an origination message from AT 202 (via BTS 210, BSC 212, and PCF 216), seeking to establish a packet-data session. Upon authentication and authorization of the user-subscriber via a query to AAA server 232, PDSN 218 may then grant the request. Exemplary packet data sessions could include a point-to-point protocol (PPP) session between AT 202 (or similar device) and the PDSN 218, and a mobile Internet Protocol (Mobile IP) session between AT 202 and a Mobile IP home agent (HA) 240. In response, PDSN 218 may negotiate with the AT 202 to establish a data-link layer connection, and PDSN 218 or HA 240 may assign an IP address for the AT 202 to use in communications in the packet network 222. A packet data session is thus established and packet data communications to and from AT 202 may then flow through the PDSN 218 during the session.

With a packet-data session established and an IP address assigned, the user of AT 202 may then engage in IP communications and multimedia services hosted in or supported by the IMS network 236. Additional details of IMS services and communications are discussed below.

The components of RAN 209 illustrated in FIG. 2 represent functional elements, and although only one of each is shown in the figure, a given deployment may in practice include more than one of any or all them in various configurations. For example, as noted above, a given BSC could control multiple BTSs. Further, an MSC could in turn control multiple BSCs, and a given metropolitan area could include multiple MSCs or even multiple RANs connected via carrier's core network 220 or other interconnecting network, for example. Still further, multiple metropolitan areas, each with a hierarchical arrangement of MSCs, BSCs, and BTSs, or with multiple RANs, for example, could be connected via the carrier's backbone network (e.g., core network 220). Similar arrangements of one-to-many are also possible for PDSNs-to-BSCs as well, as are other configurations. The above examples are not mean to be exhaustive or limiting.

Additionally, each functional element of RAN 209 may be implemented as a separate physical entity, or various combinations of them may be integrated into one or more physical platforms. For example, BTS 210 and BSC 212 may be implemented in a single physical device. Similarly, PCF 216 and PDSN 218 could be combined on a single platform. Other physical configurations of the functional elements of the RAN may also be realized.

Access to landline circuit-based services in network 200, such as conventional circuit-switched telephony, is preferably provided by landline circuit access network 225. Represented in FIG. 2 by a single service switching point (SSP) 226, landline circuit access network 225 typically comprises one or more conventional telephony switches (or similar network entities) at the end office (or offices) of a LEC, for instance, together with interconnecting digital trunks and tandem switches. Similarly to MSC 214, SSP 226 in turn provides connectivity to core network 220, to one or more other SSPs or MSCs (either directly or via core network 220), or to PSTN 224 via digital trunks or similar links to a switch or switches in the PSTN. Access by a device such as telephone 204 to SSP 226 could be via residential local loop, or a digital or analog line to an intervening PBX switch (not shown), for example. Other arrangements are possible as well.

Access to landline packet-data services in network 200, such as web browsing, VoIP, and email communications, is provided by landline packet access network 227. Represented in FIG. 2 by a single network access server (NAS) 228, landline packet access network 227 could comprise a local area network (LAN), such as an enterprise network, a packet-cable distribution system, a cable modem distribution system, a digital subscriber line (DSL) distribution system, or the like, which provides connectivity between landline subscriber stations and NAS 228. In turn, NAS 228, which could comprise one or more routers, DSL switches, cable modem termination systems, or remote-access chassis, for example, provides connectivity to IMS network 236 via packet network 222, as well as to core network 220. Alternatively or additionally, landline packet access network 227 may comprise a landline telephone system that provides dial-up connectivity between landline subscriber stations utilizing modems, for example, and NAS 228. Intelligent devices such as client station 208 may have wired connectivity, such as Ethernet, to landline packet access network 227. Preferably, landline packet access network 227 also includes one or more wireless access points (WAPs), such WAP 230, to support wireless WLAN access technologies, such as wireless Ethernet (IEEE 802.11), for example, for devices such as wireless client station 206.

As described above, an access network provides a point of contact and an entry into network 200 and its services for an access terminal or client station. As such, each access network may be considered as a path to and from other components and networks of network 200. With regard to IP services in particular, an access network may be considered as providing a communicative coupling between an access terminal or client station and the IMS network. It will be appreciated that this coupling may include one or more intermediate legs or links, some of which may be external to the actual access network. However, from the perspective of either the AT or the IMS network, the access network is a fundamental element of the communicative coupling.

Although not shown in FIG. 2, note that other switches may be present in the telecommunication network 200 as well, interconnected by core network 220 or other transport networks, for example. For instance, an inter-exchange carrier (IXC) may provide a switch (e.g., Nortel DMS-250) that serves a connection between LEC switches, MSCs or other regional telecommunication systems, so as to facilitate long distance and other inter-switch calling. As another example, private switches (e.g., PBX servers) might be provided to serve enterprises or other groups of subscribers (e.g., hotels, campuses, etc.) Other examples are possible as well.

Delivery of circuit services to users may involve additional network servers, entities, and subsystems which are part of network 200, but which have been omitted from FIG. 2 for the sake of brevity. For example, signaling for setup and management of circuit-based calls and services may be provided by a signaling subsystem/network such as SS7. Thus, while MSC 214 and SSP 226 may comprise certain aspects of an SS7 system, or the like, other elements that make up the system but are not shown could also be connected via core network 220. Delivery of packet-based services is discussed in more detail in the next subsection.

2. IMS NETWORK a. Architecture

Figure 3:
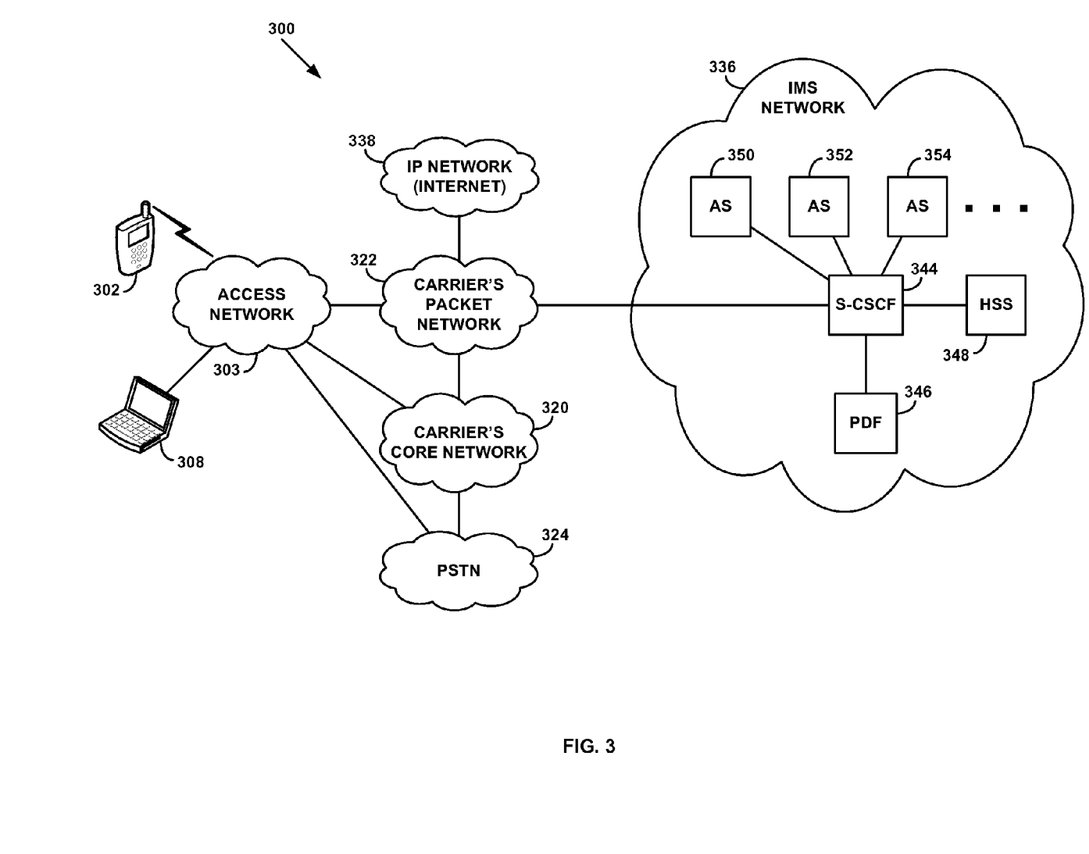
FIG. 3 is an example representation of a carrier network in which aggregate registration and transparent data notification can be carried out, wherein certain relevant details of the IMS network are shown in the example representation.

An alternate representation of network 200 is shown in FIG. 3 as network 300. In the depiction of network 300, for the sake of brevity, the three access networks of FIG. 2 are rendered as just one, and their details, as well as those of some of the inter-network connections shown in FIG. 2, are abbreviated or omitted. Instead, the IMS network, relabeled in FIG. 3 as IMS network 336, is expanded to illustrate aspects related to service delivery and relevant to the discussion of aggregate service registration. It will be appreciated that IMS network 336 remains a simplified view of an IMS architecture that resembles similar architectures developed under the auspices of 3GPP or 3GPP2, for example. Certain aspects of IMS network 336 represent and/or support improvements in delivery of services, as well as in the ability of a network operator to introduce new services, as described below. As an additional, minor difference between the two figures, only two client devices, AT 302 and PC 308, are shown in network 300.

In FIG. 3, IMS network 336 is seen to comprise a Serving Call Session Control Function (S-CSCF) 344 as a connecting element to network 322. Communications over this connection may include signaling and call control between external networks and IMS network 336, for instance. In particular, services in the 3G IMS network are based largely on SIP signaling and call control (among other protocols), and the CSCF typically incorporates the functions of a SIP proxy (and/or registrar) server into a framework suited for wireless user mobility.

As shown, S-CSCF 344 is also connected to "Home Subscriber Server" ("HSS") 348, a database that stores user profiles that enumerate and/or define privileges of individual users, including the services to which they are entitled or to which they have subscribed. The S-CSCF is additionally connected to application servers (ASs) 350, 352, and 354, all of which are components of the IMS network. The ellipses to the right of AS 354 are meant to indicate that there could be additional application servers in the IMS network, each of which could be communicatively connected to the S-CSCF.

The application servers are the IMS components that actually host many of the services and applications of the network. Thus, while much of the other infrastructure of the IMS (and more generally, the 3G) network supports signaling and control of services, as well transport of media, many of the services themselves are implemented as programs or applications on the application and media servers. It will be appreciated that some services, such as peer-to-peer VoIP calls, may involve only signaling and media transport without any additional AS- or MS-based service components. However, IMS services are more generally considered to include server-based components, and one of the aims of the IMS architecture is to simplify the expansion of IMS service offerings. Examples of such services include presence, "Push-to-Talk," and interactive, location-based applications.

The intermediary role of the S-CSCF and the use of standard communication interfaces between the S-CSCF and the application servers (as depicted in IMS network 336) accommodate a predictable and systematic approach to service expansion. Further, as an integration point in the IMS network for new and expanded services, the S-CSCF not only serves as an intermediary for service requests, but also advantageously acts a gateway between these servers and other support elements of the IMS (and more generally, the 3G) network. As such, the S-CSCF can facilitate the isolation and protection of sensitive network components, including, for instance, the HSS and even supporting subnetworks, from application servers that may need to access them but may lack appropriate interfaces and/or sufficient levels of trust.

Continuing with the description of IMS network 336, S-CSCF 344 is also connected to PDF 346. Interaction between S-CSCF 344 and PDF 346, which could be based on COPS, for instance, helps the IMS coordinate resource allocation when multiple services are invoked or requested by a user. Note in its role as a service gateway, the S-CSCF can provide intermediary communications between application servers and the PDF, and the HSS, among other elements of the IMS network.

Although not shown in this illustration, PDF 346 can be connected to Policy Enforcement Points (PEPs) within or associated with resource-allocating elements, such as border router 342, PDSN 318, and a media gateway (MGW) 334. Each of these network elements—the PDSN, border router, and media gateway—represents network resources that could be required to support one or more IMS-based services. Each PEP acts as a sort of agent, monitoring and controlling resource allocation of its host element (e.g., border router, PDSN, MGW, etc.) under the direction of the PDF.

A user may request an IMS service by issuing a SIP INVITE or other SIP message from a client device, such as AT 302, to S-CSCF 344. In practice, S-CSCF 344 may be one of three separate CSCFs that act together to support user mobility. Specifically, AT 302 may register via a proxy CSCF (P-CSCF), which becomes a first point of contact for SIP messages to and from the client device. The P-CSCF then communicates with an interrogating CSCF (I-CSCF), which in turn communicates with the user's home or serving CSCF (S-CSCF). The user actually registers with the S-CSCF, which then processes the user's subsequent service requests. The P-CSCF provides a local signaling contact point when the user is "away from home," while the I-CSCF acts as a sort of signaling gatekeeper between the P-CSCF and S-CSCF when they reside in different networks, for example. Through their collective actions, the three CSCFs process and route SIP (or other) signaling messages on behalf of a user, and in the service of establishing media sessions.

In the context of the present discussion, only the S-CSCF is considered (and shown in FIG. 3), because it is typically the S-CSCF that communicates with the application and services via the servers and platform that host them. Thus, while a user's service requests will generally traverse a P-CSCF and I-CSCF before arriving at the user's S-CSCF, processing of those requests and communication with the services themselves is handled by the S-CSCF. Consequently, there is no loss of generality with respect to the present invention in depicting just a single S-CSCF 344, as in FIG. 3. Further, it is possible for a single CSCF to incorporate the functions of all three CSCFs, acting as one or another depending on the specific communication being processed. Note that if the user is already in his or her home network, then only the S-CSCF may be involved in any case. It will be appreciated that the arrangement of CSCFs described above is exemplary, and other signaling architectures could be used as well without limiting the scope or spirit of the present invention.

In both FIGS. 2 and 3, the depiction of (generally) just one of each network element in networks 200 and 300 is illustrative, and there could be more than one of any of them, as well as other types of elements not shown. The particular arrangement shown in FIGS. 2 and 3 should not be viewed as limiting with respect to the present invention. Further, the network components that make up a communication system such as network 200 or network 300 are typically implemented as a combination of one or more integrated and/or distributed platforms, each comprising one or more general purpose and/or special purpose computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more general purpose and/or special purpose computer processors to carry out the network-side functions, steps, and procedures of the various embodiments of the present invention described herein. Similarly, a communication device such as exemplary client access devices 202, 204, 206, and 208, or AT 302 and PC 308, typically comprises a user-interface, I/O components, a communication interface, a processing unit, and data storage, all of which may be coupled together by a system bus or other mechanism. Such a device also typically comprises software or firmware stored in the data storage and executable by the processing unit to carry out client-side functions, steps, and procedures of the various embodiments of the present invention described herein. As such, networks 200 and 300, and client access devices 202, 204, 206, and 208, and AT 302 and PC 308, collectively are representative of example means of implementing and carrying out the various functions, steps, and procedures described herein.

b. Service Registration

In many (if not all) cases, a user must register with a service or application before invoking or accessing that service. As described below, service registration in the IMS network involves user registration with an S-CSCF, and subsequent notification to services of the registration. When a user registers in the IMS network, S-CSCF 344 will send a request to HSS 348 for the user's profile. The request may also involve some form of user authentication and authorization as well. Through the user profile, the S-CSCF may determine the services to which a user has subscribed, and how to handle calls and other media sessions involving the user. As the user's registrar, the S-CSCF also becomes a point of contact (possibly by way of a P-CSCF) for other users and services involved in SIP-based communications with the user.

In accordance with standards and recommended best practices for IMS services deployment, the S-CSCF does not actually forward or route user registration requests to the services or applications being requested. Rather, services and applications first "subscribe" to registration "events" at the S-CSCF, and the S-CSCF in turn "notifies" services and applications when it receives registration requests. Specifically, IMS service and application registration uses the SIP SUBSCRIBE/NOTIFY mechanism, whereby a particular service (or application) sends a SIP SUBSCRIBE message to the S-CSCF in order to establish a standing request to be alerted when the S-CSCF receives registration requests.

In response to receiving the SUBSCRIBE message from a particular service, the S-CSCF thereafter alerts the particular service when the S-CSCF receives registration requests from users (i.e., from their user agents). More specifically, the SUBSCRIBE message includes information indicative of the subscribing entity, such as a network address, so that the S-CSCF knows who or what has subscribed, and how to contact the subscribing entity. Consequently, when the S-CSCF receives a SIP REGISTER message the S-CSCF sends a SIP NOTIFY message to the particular service using the contact information supplied in the SUBSCRIBE message. Note that the S-CSCF may first determine if the user is authorized to register for services by consulting the user's profile for instance. The NOTIFY message includes an identity of the user that issued the registration request (SIP REGISTER message), so that the particular service knows who (or what) has registered. Thus, receipt of the SIP NOTIFY message at the service (or application) effectively registers the identified user with the particular service, by virtue of the identified user having registered via the S-CSCF. Use of this registration mechanism for all IMS services establishes a simple, efficient, and uniform approach not only to service registration, but to quick and reliable integration of new services and applications as they are developed or become available.

While this method of IMS service registration admits a certain ease of use and simplicity of implementation, as note above, it does not provide an efficient way for a user to register for a plurality of services that expect or require application-specific data as part of the registration process. Following conventional practices, a user must directly contact each service in order to provide any service-specific data associated with the service or with service registration. Accordingly, example embodiments of the present invention support the ability of a user to register for a plurality of services or applications, any or all of which require application-specific data, advantageously by issuing a single aggregate registration request.

In an example embodiment, the user agent on an AT (or other client access device) will generate an aggregate registration request that includes a unique service identifier for each service with which the UA wishes to register, and that additionally includes a service-specific data set for each service identified. Each service's identifier is one that is unique at least within a particular service provider's IMS network, and is known to user entities (e.g. user agents on client devices). In accordance with the example embodiment, the aggregate service request will comprise a SIP REGISTER message, and the service identifiers and service-specific data sets will be formatted according to XML and be included within the message body.

In further accordance with the example embodiment, the SUBSCRIBE message from a particular service to the S-CSCF will include, among other information, the unique service identifier for the particular service. When the S-CSCF receives an aggregate registration request (i.e., receives the SIP REGISTER message), it will determine each service requested according the service identifier, and will also identify and extract the associated service-specific data. The S-CSCF will then use the SIP NOTIFY message as described above, sending a plurality of SIP NOTIFY messages, one (or more) for each identified service. Advantageously, each NOTIFY message will also include the service-specific data set for the identified service.

In still further accordance with the example embodiment, the S-CSCF may not, and does not need to, be aware of the contents of the application-specific data sets that it puts in each NOTIFY message. Indeed, the application-specific data could be proprietary to a particular application, and even be encrypted. The S-CSCF simply extracts each application-specific data set from the REGISTER message, and then includes it in the NOTIFY for the associated service. Thus, in this sense, the S-CSCF transparently transfers application-specific data supplied in a REGISTER message to one or more services. In this manner, a single, aggregate REGISTER message will be used to register the user for the plurality of services and to transparently supply each of the services with service-specific data. The example embodiment is described in detail below.

Figure 4:
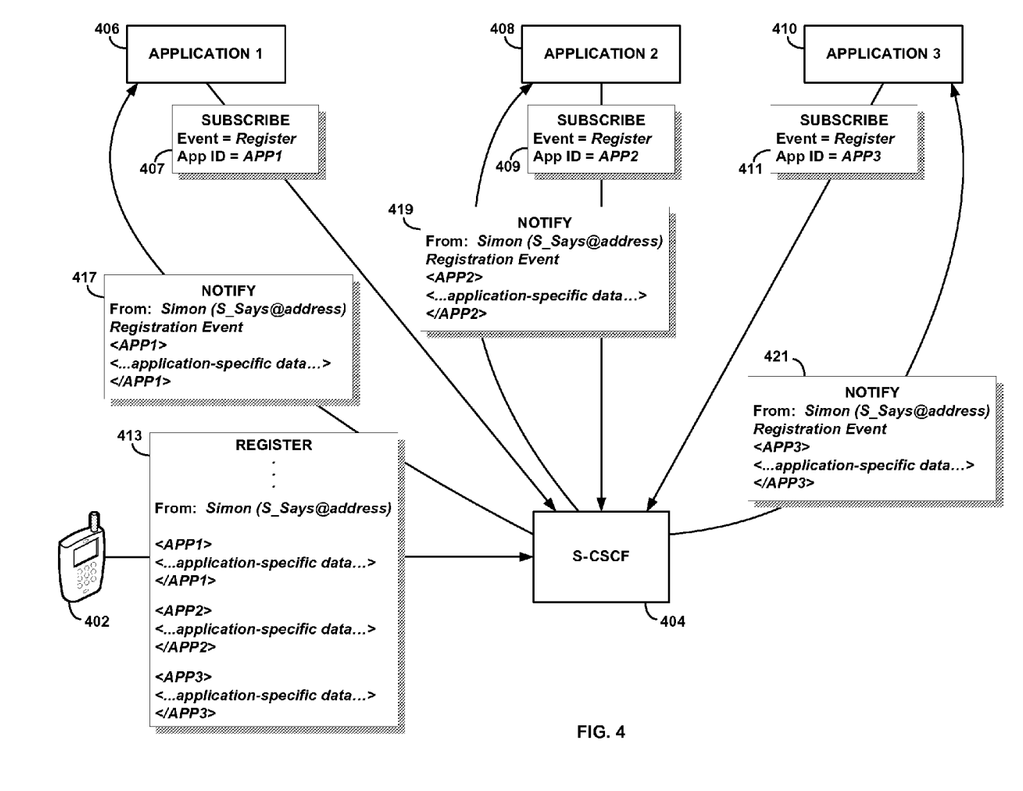
FIG. 4 illustrates the operational principles of an example embodiment of aggregate registration and transparent data notification.

3. EXAMPLE EMBODIMENT OF AGGREGATE REGISTRATION AND TRANSPARENT DATA NOTIFICATION a. Operational Principles FIG. 4 illustrates the operational principles of an example embodiment of aggregate registration and transparent data notification in a communication system such as network 200 and 300 in FIGS. 2 and 3. In the figure, an access terminal 402 communicates with S-CSCF 404 in order to register with applications 406, 408, and 410, which are labeled "Application 1," "Application 2," and "Application 3," respectively. In practice, AT 402 would be associated with a user or subscriber in the communication system, and a user agent program running on the access terminal would engage in the aggregate registration procedure with S-CSCF 404 according a signaling and call control protocol. By way of example, the protocol is taken herein to be SIP, and the user agent is taken to be a SIP user agent. However, other suitable protocols could be used as well. Further, for the sake of brevity in FIG. 4, the SIP messages and transactions are abbreviated. A person of routine familiarity with SIP (or other similar protocols) would readily understand how to fully define and construct the messages and complete the transactions represented in the illustration of FIG. 4.

Each of applications 406, 408, 410 could be implemented as a software program (or programs) stored in physical memory of and running on one or more application servers, such as those described generally above. For example, each could be executing on a separate computer platform or server, all could be executing on the same physical server, or some other combination of common and distinct servers. It will be appreciated that a variety of physical and logical architectures could be used for deploying a plurality of services and applications in a communication system. Further, the term "service" as used herein generally refers to a particular beneficial, helpful, or useful action or set of actions made available by the system to users or subscribers in the system, while the term "application" generally refers to a program or other form of implementation that functions to carry out or deliver one or more services. However, depending on the context, services and applications are sometimes considered synonymous. In the context of the aggregate registration process described herein, the two terms are generally used interchangeably.

In accordance with the example embodiment, each application will subscribe to registration events at the S-CSCF, so as to be alerted by the S-CSCF whenever such events of relevance to the application occur. Thus, Application 1 sends a SUBSCRIBE message 407 to the S-CSCF. As shown, message 407 includes the "SUBSCRIBE" SIP header, an event type of "Register," and an application identifier ("App ID" label in message 407) of "APP1." The application identifier tells the S-CSCF which application is subscribing, and what type of registration events the subscriber wants to know about. It should be understood that "APP1" is just an example identifier used here for the purposes of illustration. The straight arrow from Application 1 to the S-CSCF with message 407 overlaid represents the sending of the message. In further accordance with the example embodiment, Application 2 sends a SUBSCRIBE message 409 to the S-CSCF, while Application 3 sends a SUBSCRIBE message 411 to S-CSCF. Message 409 includes an application identifier of "APP2," while message 411 includes an identifier of "APP3." Both messages include an event type of "Register."

Having received the SUBSCRIBE messages, the S-CSCF 404 will thereafter inform each application of registration events; i.e., reception by the S-CSCF of registration requests from user agents. In particular, the S-CSCF will advantageously recognize the presence of a plurality of application identifiers in a single aggregate registration message as a request by the sending user agent to register for the plurality of applications. This is illustrated in FIG. 4 with REGISTER message 413 sent by AT 402 to S-CSCF 404.

Message 413 includes the "REGISTER" SIP header, information indicating the user who is making the request, and a message "body" that identifies each of APP1, APP2, and APP3, and further includes application-specific data sets for each application. By way of example, the application identifiers and the respective application-specific data sets are organized according to simple XML format. For example, the construct "<APP1>< . . . application-specific data . . . ></APP 1>" delineates the identifier and application-specific data set for Application 1 in the XML-formatted message body. As shown, the same formatting is used for Application 2 and Application 3. All three constructs are included in the message body, advantageously aggregating three registration requests into a single REGISTER message. The XML protocol is well-known in the art, and is not described further herein.

In accordance with SIP conventions, the user making the request is identified by a "From:" header followed by the user's name (symbolic or otherwise) and a network address for the user. In the illustration of FIG. 4, the user is identified as "Simon" with an address of "S_Says@address." It will be appreciated that other address formats could be used. Note the vertical ellipses between the REGISTER header and the user identity in message 413 is meant to signify presence of other message elements not detailed in the present illustration.

Upon receiving REGISTER message 413 from AT 402, the S-CSCF will process the message as an aggregate registration request according to the presence of the three application identifiers and their associated application-specific data sets. Specifically, S-CSCF 404 will extract each data set from the XML-formatted body message 413, and then advantageously generate and send a respective NOTIFY message to each of Application 1, Application 2, and Application 3. This is illustrated in FIG. 4, where in accordance with the example embodiment, NOTIFY message 417 is sent to Application 1, NOTIFY message 419 is sent to Application 2, and NOTIFY message 421 is sent to Application 3. The curved arrows from the S-CSCF to each application with the NOTIFY messages overlaid represent the sending of the messages.

By way of example, NOTIFY message 417 includes the "NOTIFY" SIP header and a message body comprising an application identifier of APP1 and the application-specific data set supplied in the REGISTER message 413 to the S-CSCF. Message 417 also includes the same "From:" header as supplied in REGISTER message 413. Thus, Application 1 is informed of the user who sent the REGISTER message. Each of messages 419 and 421 are similarly constructed, but with identifiers and data specific to Application 2 and Application 3, respectively. As noted above, the S-CSCF does not need to know the contents of the application data. Rather, the application-specific data sets are transparently passed along to each of the applications in their respective NOTIFY messages.

The receipt by each of Application 1, Application 2, and Application 3 of its respective NOTIFY message effectively establishes the user as registered with the application. Each NOTIFY message also supplies the respective application with its application-specific data set, thereby avoiding the need of the user (or the user agent) to directly contact each application for the purpose of sending the data. Thus a single, aggregate registration request sent by the user agent facilitates registration for a plurality of applications (or services), and supports passing application-specific data to each application in the same request.

An example of an application that expects or requires application-specific data is "Push-to-Talk" ("PTT"). The application-specific data set for PTT might include the current location of the access terminal (e.g., latitude and longitude), vocoders supported by the AT, a network identification, communication port numbers, and specific device type, among other information. In accordance with the example embodiment, this information would comprise the application-specific data set, and be supplied in the aggregate registration message sent from the AT to the S-CSCF, and in turn supplied to the PTT application in the NOTIFY message sent by the S-CSCF.

Another example of an application that expects or requires application-specific data is "Presence." In this case, the application-specific data set might include location, presence state (e.g., disposition of the user with respect to receiving communications from other users), device type and capabilities, and presence-related applications that the user wishes to have invoked by the presence server. Yet another example application is a streaming media service, such as an audio or video broadcast. Application-specific data could again include user location, device capabilities, and user preferences regarding media content. The single, aggregate REGISTER could thus contain the application-specific data sets for the PTT application, presence, and the media-streaming application as well. The S-CSCF would send separate NOTIFY messages to the appropriate servers, each NOTIFY including the respective application-specific data sets.

Note that an aggregate registration message could include one or more applications having an empty data set. That is, one or more of the applications could have no associated application-specific data, or at least none that is expected or required when a user registers. Only the service identifier would be included in the aggregate registration message for any such application. A construct such as "<APPn></APPn>" could be included for such an application. The S-CSCF could use the service identifier to as a sort of filter to determine which services or applications that subscribed to register events should in fact receive notification of such events. Thus, the S-CSCF could selectively notify services that subscribed to registration events according to whether or not those services are identified in an aggregate registration message, even if some or all of those services do not expect or require application-specific data during registration.

The user agent running on the user's AT could generate the aggregate registration request according to user input or other pre-configured information. For example, the user could enter information at a keypad to select the applications to which the user agent should register. The selection could be text-based or menu-based. The user agent could then use the input to generate an aggregate registration message. In constructing the message, the user agent could assemble information stored in the AT's memory, such as application identifiers and application-specific data. Other arrangements are possible as well. The REGISTER message could be issued upon user command or automatically upon establishment of a data session in a RAN or other form of access network described above. Further, the user agent could generate and send more than one aggregate registration message. For instance, one such message might register for a first plurality of applications, a second message might register for a second plurality, and so on. With each aggregate registration message issued, the user agent would advantageously initiate registration for a different plurality of applications on the user's behalf.

b. Example Operation

Figure 5:
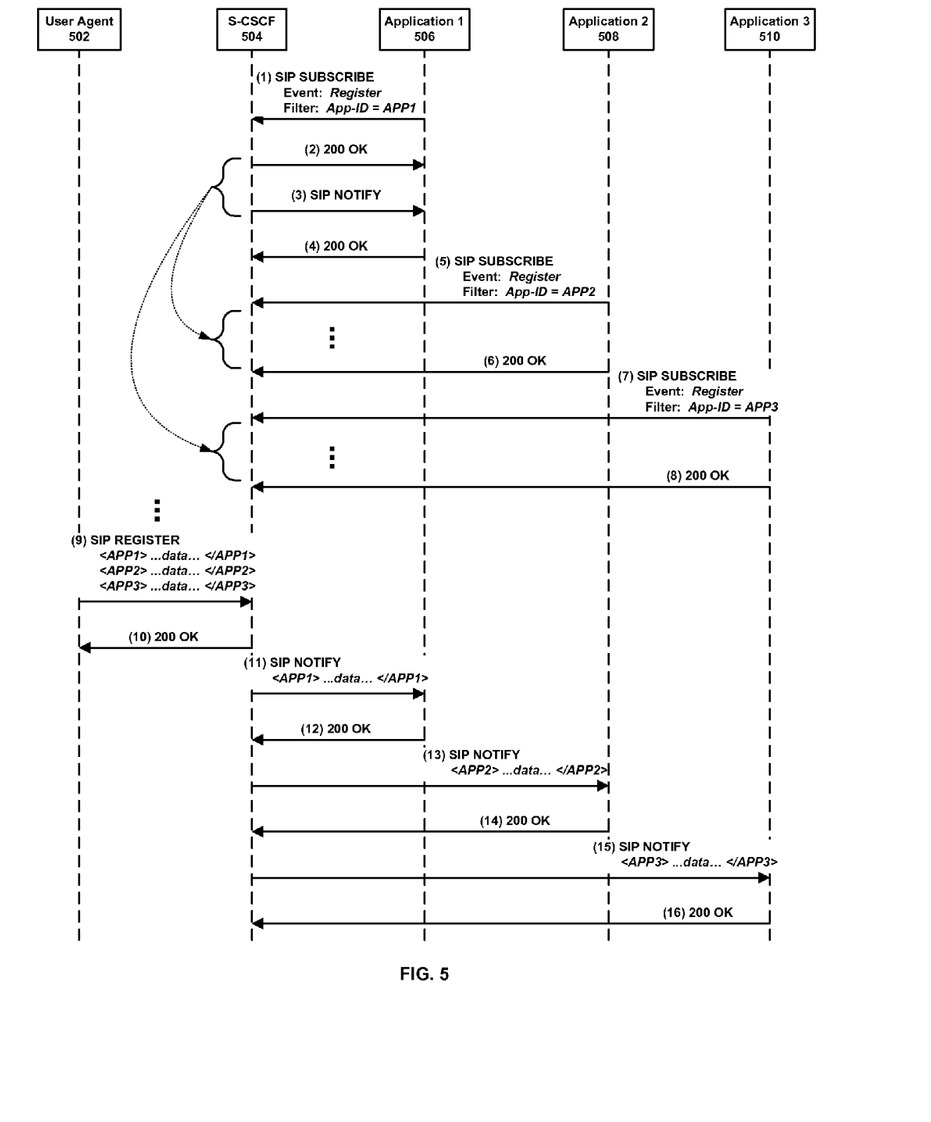
FIG. 5 is a call flow that illustrates operation of an example embodiment of aggregate registration and transparent data notification.

Example operation of aggregate registration and transparent data notification is illustrated FIG. 5, which represents the method in the form a call flow. As shown in the figure, elements that exchange messages include User Agent 502, S-CSCF 504, Application 1 506, Application 2 508, and Application 3 510. Again by way of example, the signaling and call control protocol used is SIP. As with the entities depicted in FIG. 4, each of the elements in FIG. 5 could, for instance, be implemented as one or more computer-executable software and/or firmware programs stored in machine-readable memory on a hardware platform and executed by one or more general purpose or special purpose processors of the platform.

As shown, Application 1 sends a SIP SUBSCRIBE message (1) to S-CSCF 504. Message (1) includes an event identifier of "Register" and a filter of App-ID set to APP1. As such, Application 1 subscribes to registration events at the S-CSCF, and identifies itself (according to "APP1") as the subscribing entity. The S-CSCF replies with a SIP 200 OK message (2), followed by an "empty" SIP NOTIFY message (3). The sequence of message (1), (2), and (3) is carried out according the SIP specification for the SUBSCRIBE/NOTIFY mechanism, and establishes the subscription of Application 1 at S-CSCF 504.

Messages (5) and (6) similarly establish the subscription of Application 2 at S-CSCF 504, while messages (7) and (8) establish a subscription for Application 3. Note that messages analogous to messages (2) and (3) are abbreviated as vertical ellipses in the subscription-message sequences for each of Applications 2 and 3. This is indicated by the curved, dashed arrows from the curly bracket next to messages (2) and (3) to each of the curly brackets next to the vertical ellipses.

At some later time, User Agent 502 sends an aggregate SIP REGISTER message (9) to S-CSCF 504. As depicted in the figure, the aggregate registration message includes a service identifier and application-specific data for each of Applications 1, 2, and 3. Again, this information is formatted according to XML. In this illustration, the "From:" header has been omitted for the sake of brevity. However, it should be understood that this header, as well as other proper SIP REGISTER message content, could be included in the message. The S-CSCF replies with a SIP 200 OK message (10) to complete the registration transaction. Note also that the vertical ellipses preceding the message (9) are meant to indicate that the message is sent at some time after the three applications have subscribed to registration events at the S-CSCF.

Responsive to receiving SIP REGISTRATION message (9), S-CSCF 504 sends a SIP NOTIFY message to each of Applications 1, 2, and 3. These are shown in message transactions (11)-(12), (13)-(14), and (15)-(16). The first message in each pair is a SIP NOTIFY message sent from the S-CSCF to the application that contains the application-specific data set supplied in the SIP REGISTER message. The second message in each pair is a SIP 200 OK message sent by the application to the S-CSCF that completes the notification transaction. The application-specific data set in each NOTIFY message is identified in the REGISTER message by the S-CSCF according to the service identifier. The S-CSCF places the respective application-specific data set in the NOTIFY message for identified application. By way of example, simple XML format is used to include the application-specific data set in each NOTIFY message. Upon completion of each transaction (SIP 200 OK message), the user at User Agent 502 is registered with each application, and each application has received its application-specific data, passed to it transparently S-CSCF 504.

It will be appreciated that call-flow of FIG. 5 corresponds to a generalized illustration of aggregate registration and transparent data notification in an IMS network. The call flow should not be viewed excluding other possible steps and/or messages, or alternative ordering of steps in accordance with SIP or other suitable call control and signaling protocols.

4. EXAMPLE PLATFORMS a. S-CSCF

Figure 6:
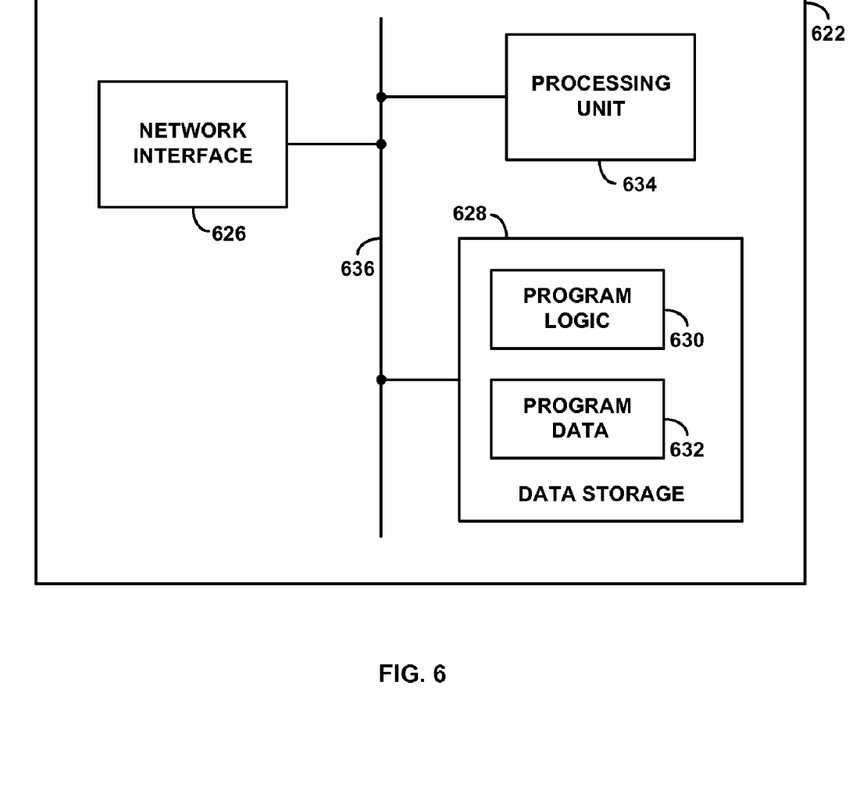
FIG. 6 illustrates an example S-CSCF arranged to carry out the network-side functions of aggregate registration and transparent data notification.

FIG. 6 is a simplified block diagram depicting functional components of an example S-CSCF 622 arranged to carry out the network-side functions of aggregate registration and transparent data notification described above. As shown in FIG. 6, the example S-CSCF 622, representative of S-CSCF 344 FIG. 3, for instance, includes a network interface 626, a processing unit 634, and data storage 628, all of which may be coupled together by a system bus 636 or other mechanism. In addition, the S-CSCF may also include external storage, such as magnetic or optical disk storage, although this is not shown in FIG. 6.

Network interface 626 enables communication on a network, such as IMS network 336. As such, network interface 626 may take the form of an Ethernet network interface card that can be coupled with a router or switch to a network such as IMS network 336, for example, or connected to a subnet, which in turn is coupled to core network 336. By way of example, the subnet could be a LAN that interconnects components that comprise a service-delivery subsystem. Example components could include external disk storage for content in the form of data files, and an operator interface for provisioning the subsystem. Alternatively, network interface 626 may take other forms, providing for wired and/or wireless communication on a network or a subnet.

Processing unit 634 comprises one or more general purpose processors and/or one or more special purpose processors. And data storage 628 comprises one or more volatile and/or non-volatile storage components, which can be integrated in whole or in part with processing unit 634. As further shown, data storage 628 is equipped to hold program logic 630 and program data 632.

Program logic 630 preferably comprises machine language instructions that are executable by processing unit 634 to carry out various functions described herein. By way of example, the program logic 630 may be executable by processing unit 634 to receive and establish subscriptions from one or more applications and/or services in the IMS network, and to receive an aggregate registration request (via network interface 626) from a user agent, sent by way an access network communicatively coupled with IMS network 336. Further, the program logic 630 is preferably executable by processing unit 634 to process aggregate registration requests (received via network interface 626) in accordance with the example embodiments described herein, including determining the application identifiers and application-specific data contained in aggregate registration requests, generating notifications to the identified applications, wherein the notifications include the application-specific data, and sending the notifications to the identified applications (via network interface 626).

Program data 632 could be used for storing data used in conjunction with various aspects of the processing. For instance, a tabulation of applications which have subscribed to registration events at the S-CSCF could be maintained in program data 632. It will be appreciated that storage for program data could have wide-ranging utility for the functions described herein, as well other functions of the S-CSCF.

According to an example embodiment, when an aggregate registration request is received at network interface 626 from a user agent by way of an access network that is communicatively coupled to the IMS network, the request will be delivered to a program executing in processing unit 634 according to instructions stored in program logic 630. The program (i.e. the instructions executed by the processor) will recognize, among other information contained in the request, each instance of an application identifier and an associated application-specific data set in the request, and will responsively generate a notification message for the indentified application, provided the application had previously subscribed to registration events at the S-CSCF. Each generated notification message will comprise information indicative of the user that sent the aggregate registration request (i.e., the user on whose behalf the user agent sent the request), the application identifier, and the application-specific data set. Advantageously, the application-specific data set will be transparently copied from the aggregate registration request into the notification. As used in the present context, the term "transparent" means that the S-CSCF (or other similar network entity) does not need to know the contents of the data set. After generating each notification, the program will send each notification to the application associated with the notification. In so doing, the program, possibly in coordination with the network interface or other networking functions of the S-CSCF, will determine a network address to which each notification should be sent, and deliver the notification to network interface 626, which will then send the notification to its intended destination.

Operation of S-CSCF 622 with respect to the functions described herein could be put into practice in numerous ways, while remaining within the scope and spirit of the present invention. As such, S-CSCF 622 is representative of means for carrying out the network-side functions of aggregate registration and transparent data notification in accordance with the methods and steps described herein by way of example. One of ordinary skill in the art would understand how to devise and build such an implementation. In practice, S-CSCF 622 will also carry out other functions besides those described herein.

b. Access Terminal

Figure 7:
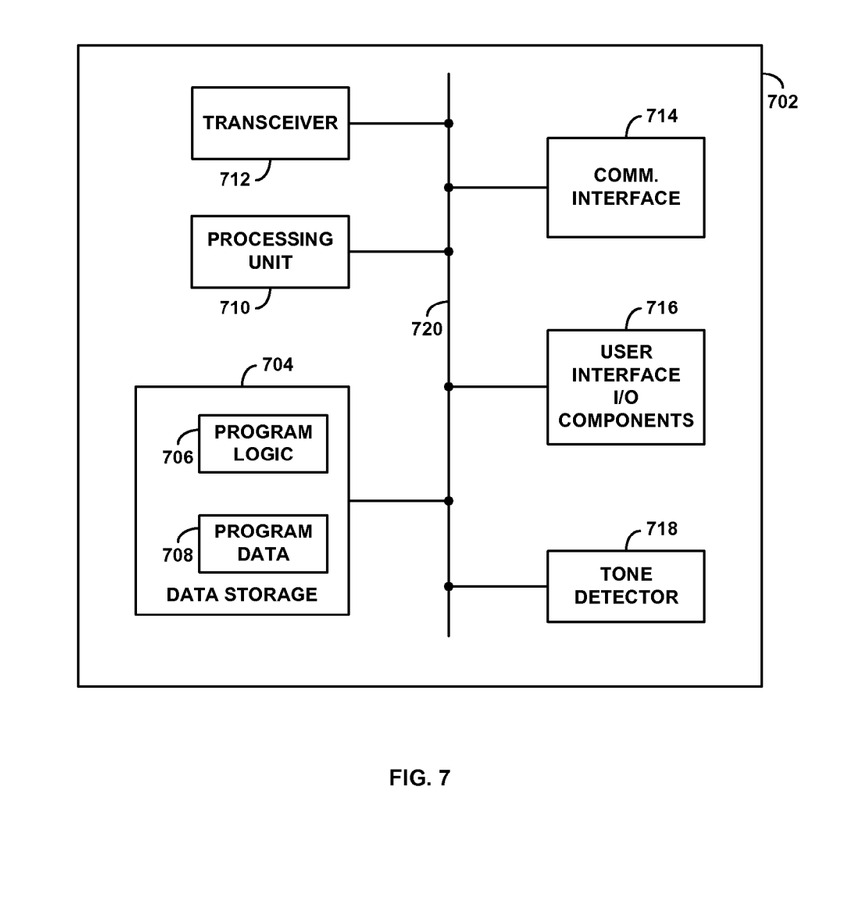
FIG. 7 illustrates an example access terminal arranged to carry out the client-side functions of aggregate registration and transparent data notification.

FIG. 7 is a simplified block diagram depicting functional components of an example access terminal 702 arranged to carry out the client-side functions of aggregate registration and transparent data notification. By way of example, AT 702 is a wireless communication device, such as a cell phone, a personal digital assistant (PDA), a pager, a wirelessly-equipped notebook computer, or any other similar device (as represented by AT 202 in FIG. 2, for instance). It should be understood that the AT 702 could also be a wireline device connected to a landline access network, such as access network 227 in FIG. 2, for instance. As shown in FIG. 7, the example AT 702 includes data storage 704, processing unit 710, transceiver 712, communication interface 714, user-interface I/O components 716, and tone detector 718, all of which may be coupled together by a system bus 720 or other mechanism.

These components may be arranged to support conventional operation in a Radio Access Network, such as RAN 209 illustrated in FIG. 2. The details of such an arrangement and how these components function to provide conventional operation, according to CDMA standards for example, are well-known in the art, and are not described further herein. Certain aspects of AT 702 relevant to aggregate registration are discussed briefly below.

Communication interface 714 in combination with transceiver 712, which may include one or more antennas, enables communication with the RAN, including sending aggregate registration messages. The communication interface may include a module, such as an MSM™-series chipset made by Qualcomm Inc. of San Diego, Calif., and supports wireless packet-data communications according to a CDMA family of protocols.

Processing unit 710 comprises one or more general-purpose processors (e.g., INTEL microprocessors) and/or one or more special-purpose processors (e.g., dedicated digital signal processor, application specific integrated circuit, etc.). In turn, the data storage 704 comprises one or more volatile and/or non-volatile storage components, such as magnetic or optical memory or disk storage. Data storage 704 can be integrated in whole or in part with processing unit 710, as cache memory or registers for instance. In example AT 702, as shown, data storage 704 is configured to hold both program logic 706 and program data 708.

Program logic 706 may comprise machine language instructions that define routines executable by processing unit 710 to carry out various functions described herein. In particular the program logic, communication interface, and transceiver may operate cooperatively to carry out the client-side operations discussed above and illustrated in FIGS. 4 and 5. Thus, program logic 706 could include instructions executable by processor 710 to implement the functions of a user agent program, such as a SIP user agent. More specifically, the user agent could generate one or more aggregate registration request in accordance with the example embodiment described above, and then send the requests via communication interface 714 to the S-CSCF. Further, a user could input a command (or commands) via user interface 716 to the user agent program instructing the user agent to generate and send an aggregate registration. Program data 708 could be arranged to store application identifiers and associated application-specific data used in generating the request.

It will be appreciated that there can be numerous specific implementations of aggregate registration in an access terminal, such as AT 702 illustrated in FIG. 7. As such, AT 702 is representative of means for carrying out the client-side functions of aggregate registration and transparent data notification in accordance with the methods and steps described herein by way of example. One of ordinary skill in the art would understand how to devise and build such an implementation.

5. CONCLUSION

An exemplary embodiment of the present invention has been described above. Those skilled in the art will understand, however, that changes and modifications may be made to the embodiment described without departing from the true scope and spirit of the invention, which is defined by the claims.

What is claimed:

1. A method of registering for a plurality of services in a communication services network, the method comprising:
    at a network entity, receiving an aggregate registration request for the plurality of services, the aggregate registration request including for each particular service of the plurality a respective service identifier and a respective service-specific data set; and
    at the network entity, sending to each particular service of the plurality a respective notification indicating receipt by the network entity of the aggregate registration request and including the respective service-specific data set for the particular service.

2. The method of claim 1, wherein receiving the aggregate registration request comprises receiving the aggregate registration sent from a user agent on behalf of a given user, and wherein the aggregate registration request further includes information indicative of the given user.

3. The method of claim 2, wherein the user agent is a SIP user agent.

4. The method of claim 3, wherein the aggregate registration request comprises a SIP REGISTER message, the SIP REGISTER message comprising a message body that includes for each particular service of the plurality the respective service identifier and the respective service-specific data set.

5. The method of claim 2, wherein the network entity comprises a Serving Call Session Control Function (S-CSCF) in the communication services network, and the user agent is implemented in an access terminal, and wherein receiving the aggregate registration request comprises receiving the aggregate registration request via an access network that communicatively couples the access terminal and the communication services network.

6. The method of claim 5, wherein the access network is a Radio Access Network, and the access terminal is wireless communication device.

7. The method of claim 1, wherein each of the plurality of services is implemented on a service platform in the communication services network, and wherein sending to each particular service of the plurality the respective notification comprises sending the respective notification to the service platform on which the particular service is implemented.

8. The method of claim 1, wherein sending to each particular service of the plurality the respective notification comprises sending the respective notification (i) in response to receiving the aggregate registration request and (ii) on a condition that the particular service had subscribed to registration events at the network entity prior to receipt at the network entity of the aggregate registration request.

9. The method of claim 8, wherein the network entity comprises a Serving Call Session Control Function (S-CSCF) in the communication services network,
    wherein the condition that the particular service had subscribed to registration events at the network entity prior to receipt at the network entity of the aggregate registration request corresponds to the particular service having sent a SIP SUBSCRIBE message to the S-CSCF prior to receipt at the network entity of the aggregate registration request, the SIP SUBSCRIBE message including a service-supplied service identifier for the particular service,
    and wherein sending the respective notification comprises sending a SIP NOTIFY message to the particular service.

10. The method of claim 9, wherein sending the SIP NOTIFY message to the particular service comprises:
    determining the identity of the particular service from the respective service identifier; and
    including the respective service-specific data for the particular service in a body of the SIP NOTIFY message.

11. The method of claim 10, wherein the respective service-specific data set for the particular service is an empty data set,
    and wherein sending the SIP NOTIFY message to the particular service further comprises sending the SIP NOTIFY message to the particular service on an additional condition that the respective service identifier matches the service-supplied identifier for the particular service.

12. The method of claim 1, wherein receiving the aggregate registration request comprises receiving the aggregate registration sent from a user agent on behalf of a given user, the aggregate registration request further including information indicative of the given user, and
    wherein sending to each particular service of the plurality the respective notification comprises:
        determining the identity of the particular service from the respective service identifier; and
        sending the respective notification only if the particular service had subscribed to registration events at the network entity prior to receipt of the aggregate registration request at the network entity, wherein the respective notification further includes an identity of the given user.

13. The method of claim 1, wherein the network entity comprises a Serving Call Session Control Function (S-CSCF) and the communication services network is an Internet Protocol Multimedia Subsystem (IMS) network,
    wherein each of the plurality of services is implemented on a service platform in the IMS network,
    wherein receiving the aggregate registration request comprises receiving the aggregate registration sent from a user agent on behalf of a given user, the aggregate registration request further including information indicative of the given user,
    and wherein sending to each particular service of the plurality the respective notification comprises registering the given user for the particular service.

14. A method of registering for a plurality of services in a communication services network, the method comprising:
    at an access terminal, generating an aggregate registration request for the plurality of services, the aggregate registration request including for each particular service of the plurality a respective service identifier and a respective service-specific data set; and
    at the access terminal, sending the aggregate registration request to a network entity that responsively notifies each particular service of the plurality of the request and further provides each particular service with its service-specific data set.

15. The method of claim 14, wherein the access terminal comprises a user agent, and wherein sending the aggregate registration request comprises the user agent sending the aggregate registration request on behalf of a given user of the access terminal.

16. The method of claim 15, wherein the user agent is a SIP user agent,
    wherein the aggregate registration request is a SIP REGISTER message that further includes an identity of the given user,
    and wherein generating the aggregate registration request for the plurality of services comprises including in the SIP REGISTER message a message body that includes for each particular service of the plurality the respective service identifier and the respective service-specific data set, the message body being formatted according to XML.

17. The method of claim 14, wherein the communication services network comprises an Internet Protocol Multimedia Subsystem (IMS) network and the network entity comprises a Serving Call Session Control Function (S-CSCF) in the IMS network,
    and wherein sending the aggregate registration request to the network entity comprises sending the aggregate registration request via an access network that communicatively couples the access terminal and the communication services network.

18. The method of claim 17, wherein the access network is a Radio Access Network, and the access terminal is wireless communication device.

19. In a network entity operating in a communication services network, an improvement comprising:
    means for receiving from an access terminal an aggregate registration request for a plurality of services, wherein the aggregate registration request includes for each particular service of the plurality a respective service identifier and a respective service-specific data set; and
    means for sending to each particular service of the plurality a respective notification indicating receipt by the network entity of the aggregate registration request and including the respective service-specific data set for the particular service.

20. The improvement of claim 19, wherein the access terminal comprises a user agent, and wherein means for receiving from the access terminal the aggregate registration request for the plurality of services comprise:
    means for receiving the aggregate registration request sent by the user agent on behalf of a user of the access terminal via an access network that communicatively couples the access terminal and the communication services network.

21. The improvement of claim 20, wherein the access network is a Radio Access Network, and the access terminal is wireless communication device.

22. The improvement of claim 19, wherein means for sending to each particular service of the plurality the respective notification comprise:
    means for determining the identity of the particular service from the respective service identifier;
    means for determining whether the particular service has subscribed to registration events at the network entity; and
    means for sending the respective notification (i) in response to receiving the aggregate registration request and (ii) conditioned on the particular service having subscribed to registration events at the network entity.

23. The improvement of claim 19, wherein the communication services network comprises an Internet Protocol Multimedia Subsystem (IMS) network, and the network entity is a Serving Call Session Control Function (S-CSCF) in the IMS network,
    wherein the access terminal comprises a SIP user agent,
    wherein means for receiving from the access terminal the aggregate registration request comprises:
        means for receiving a SIP REGISTER message sent by the SIP user agent on behalf of a user of the access terminal, the SIP REGISTER message further including information indicative of the user,
    and wherein means for sending to each particular service of the plurality the respective notification comprise:
        means for sending a SIP NOTIFY message to the particular service (i) responsive to receiving the SIP REGISTER message and (ii) on a condition that a SIP SUBSCRIBE message had previously been received from the particular service;

means for including the respective service-specific data for the particular service in a body of the SIP NOTIFY message; and means for registering the user for the particular service.

24. In an access terminal operating in a communication services network, an improvement comprising:

means for generating an aggregate registration request for a plurality of services, the aggregate registration request including for each particular service of the plurality a respective service identifier and a respective service-specific data set; and means for sending the aggregate registration request to a network entity that responsively notifies each particular service of the plurality of the request and further provides each particular service with its service-specific data set.

25. The improvement of claim 24, wherein the communication services network comprises an Internet Protocol Multimedia Subsystem (IMS) network, the network entity comprises a Serving Call Session Control Function (S-CSCF) in the IMS network, and the access terminal comprises a SIP user agent, wherein means for generating the aggregate registration request comprise:

means for generating a SIP REGISTER message on behalf of a user of the access terminal; and means for including in the SIP REGISTER message a message body that includes for each particular service of the plurality the respective service identifier and the respective service-specific data set, the message body being formatted according to XML; and means for further including in the SIP REGISTER message an identity of the user, and wherein means for sending the aggregate registration request to the network entity comprise:

means for sending the SIP REGISTER message to the S-CSCF via an access network that communicatively couples the access terminal and the IMS network.

* * * * *